(12) United States Patent
Kammler et al.

(10) Patent No.: US 7,036,293 B2
(45) Date of Patent: May 2, 2006

(54) DEVICE FOR WELDING OF A FOIL TUBE

(75) Inventors: Roman Kammler, Worms (DE); Ralf Bardtke, Hohenahr-Erda (DE); Walter Baur, Gruendau (DE)

(73) Assignee: Rovema Verpackungsmaschinen GmbH, Fernwald (DE)

( * ) Notice: Subject to any disclaimer, the term of this patent is extended or adjusted under 35 U.S.C. 154(b) by 0 days.

(21) Appl. No.: 10/884,385

(22) Filed: Jul. 1, 2004

(65) Prior Publication Data

US 2005/0051274 A1    Mar. 10, 2005

(30) Foreign Application Priority Data

Jul. 11, 2003    (DE) ................ 103 31 360

(51) Int. Cl.
*B65B 9/06* (2006.01)

(52) U.S. Cl. .............. 53/551; 53/374.8; 53/554; 156/580; 156/581

(58) Field of Classification Search .......... 53/551, 53/374.8, 374.6, 546, 375.6, 554; 156/580, 156/581, 583.1; 100/315, 325
See application file for complete search history.

(56) References Cited

U.S. PATENT DOCUMENTS

| | | | | |
|---|---|---|---|---|
| 4,484,977 A * | 11/1984 | Andersson | ............... | 156/583.1 |
| 4,546,592 A * | 10/1985 | Reil | ........................... | 53/373.6 |
| 4,622,798 A * | 11/1986 | Oki | ........................... | 53/374.8 |
| 4,729,210 A * | 3/1988 | Galliano | ....................... | 53/441 |
| 4,768,327 A * | 9/1988 | Mosher | ....................... | 53/451 |
| 5,170,609 A * | 12/1992 | Bullock et al. | ............... | 53/434 |
| 5,369,941 A * | 12/1994 | Rapparini | ..................... | 53/546 |
| 5,533,322 A * | 7/1996 | Bacon et al. | ................. | 53/451 |
| 5,540,035 A * | 7/1996 | Plahm et al. | ................. | 53/451 |
| 5,791,126 A | 8/1998 | Kammler et al. | | |
| 6,167,677 B1 * | 1/2001 | Kammler et al. | ............. | 53/75 |
| 6,185,915 B1 * | 2/2001 | Chang | ......................... | 53/568 |
| 6,598,367 B1 * | 7/2003 | Nakagawa et al. | ........... | 53/75 |
| 6,889,481 B1 * | 5/2005 | Helwig et al. | ............. | 53/373.7 |

* cited by examiner

*Primary Examiner*—Sameh H. Tawfik
(74) *Attorney, Agent, or Firm*—Flynn, Thiel, Boutell & Tanis, P.C.

(57) ABSTRACT

In order to be able to realize complicated jaw movements in a device for welding of a foil tube, comprising two welding jaws, which can be moved opposingly and clamp the foil tube between one another, whereby a linear motor is provided as the jaw drive, it is suggested that the gearing houses a cam plate connected to a movable part of the linear drive, that the cam plate has two separate curves, and that each one cam connected to a jaw carrier is guided along a curve.

9 Claims, 1 Drawing Sheet

DEVICE FOR WELDING OF A FOIL TUBE

FIELD OF THE INVENTION

The subject matter of the patent application is a device for welding of a foil tube for packaging purposes.

BACKGROUND OF THE INVENTION

Vertical tubular bagging machines are known, with which filled tubular bags, which are welded at the top and bottom, are manufactured. A foil tube is for this purpose first longitudinally welded. Then the foil tube is filled, is welded transversely to its transport direction and a finished tubular bag is separated from the foil tube.

Various drives and gearings to operate the welding jaws are known, which carry out a transverse welding of the foil tube in order to create the top and bottom seams of the tubular bag.

A device which is suited for this cross-welding is known from the DE 196 27 892 A1.

SUMMARY OF THE INVENTION

The foil tube is in this known device welded by means of two welding jaws, which are movable against one another and clamp the foil tube between one another. Each one jaw holder is thereby used to hold a welding jaw and each one jaw carrier to carry a jaw holder and thus a welding jaw. A linear drive with a movable part linearly movable along an active line is provided as the drive. A gearing is connected to the movable part, whereby the gearing is also connected to the jaw carriers in order to create an opposing movement of the jaw carriers and thus of the welding jaws in order to be able to move the welding jaws toward one another and away from one another.

The known device has the advantage that the jaw movement, namely the path-time diagram for the welding jaws, can be precisely specified by the gearing. Each one joint is in this device provided on the jaw carriers in order to be able to connect rods of the gearing pivotally to the jaw carriers. The rods transmit thereby the linear movement of the drive onto the jaw carriers. A relatively complicated welding-jaw movement in the horizontal direction, as is demanded for jaw holders on vertical tubular bagging machines, in order to achieve during an additional vertical movement an optimum space-curve for a welding jaw, is hereby not easily possible without a control device.

The basic purpose of the invention is to further develop a device of the above-described type in such a manner that the gearing can specify a complicated jaw movement in the horizontal direction.

The purpose is attained according to the claims. The gearing accordingly houses a cam plate connected to the movable part, the cam plate has two separate curves, and each one cam connected to a jaw carrier is guided along a curve.

The suggested device has the advantage that the gearing can specify a relatively complicated location-time function for a welding jaw. A jaw point specified in a x-direction is reached at a specific point in time when the linear drive is operated in a common manner since the corresponding line places the jaw carrier and thus the welding jaw, which is rigidly connected to the jaw carrier, at the precise time onto this coordinate. A curve can thereby be signed almost as desired in order to, for example, specify a welding duration, to define a jaw-opening width, or to permit a jaw closing as quickly as possible.

Further, advantageous developments of the invention are described in the claims.

A low friction guiding of a cam along a line is achieved when the cam is designed as a roller for rolling along the curve. The cam rolls then on the curve and thus specifies a jaw movement. A closed curve is particularly suited for this purpose.

When the curves are similarly designed, preferably mirror-symmetrically to one another with the active line as the axis of symmetry, then the welding jaws meet centrally on the foil-tube diameter when they previously had each an equal spacing from this centerline, which results in low tangential pulling forces on the foil tube and thus in a good welding result.

When the plane of the cam plate, namely its alignment, extends parallel to the plane of the device, namely in horizontal direction, then it is possible to build the device relatively low. The movable part can act in the plane of the relatively flat gearing or can act offset at a small distance parallel thereto. Thus designs are possible, which have only approximately a 200 mm building height. However, taller designs are also conceivable, which could be utilized when a relatively high space is available.

A jaw movement can be changed by exchanging a cam plate with a cam plate, which houses differently designed curves.

The path curves specified by the geometry of the curves can also be changed when a control device is provided in order to control the movement of the movable part time-dependently. The path curves are then additionally superposed by a time component in a location-time diagram. Thus it would, for example, also be possible to extend the welding operation and to reduce the jaw-opening width in order to achieve a safe and relatively quick manufacture of the bags. Thus a changing of a cam plate is no longer or only rarely necessary.

When the jaw carriers are each connected to the jaw holders by two rigid connections guided in guideways, then a very stable design of the relatively planar device is achieved, which design is resistant to twisting.

When the linear drive is designed as a linear motor, which operates according to the principle of a suspension railway, then very quick and location-precise controllable jaw movements can be achieved. This electromagnetic linear drive has in addition the advantage that a relatively high sealing pressure of approximately 5 to 8 kN is achieved. A precise pressure adjustment is thereby possible by limiting the output of the linear motor.

BRIEF DESCRIPTION OF THE DRAWING

The invention will be described in greater detail hereinafter in connection with a figure, which illustrates one exemplary embodiment. In the drawing.

DETAILED DESCRIPTION

Figure 1:
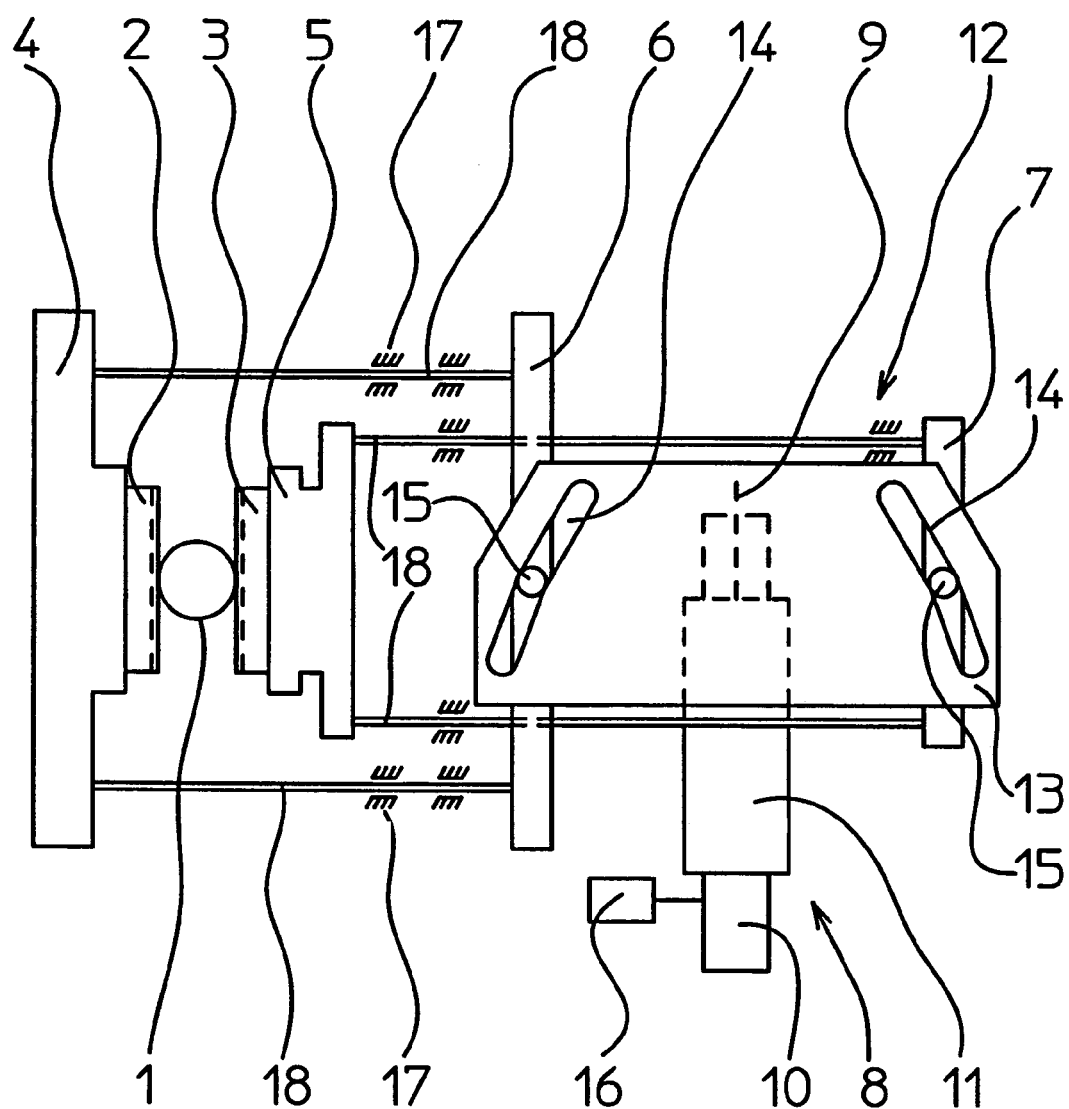
FIG. 1 is a view from above of a device for welding of a horizontally cut foil tube, in which a linear motor with a gearing having a cam plate is utilized to move welding jaws against the foil tube in order to weld these transversely to its transport direction.

This welding occurs in a device for welding of a foil tube 1 by means of two welding jaws 2, 3, which can be moved against one another and clamp the foil tube 1 between one another (FIG. 1). Two jaw holders 4, 5 are used to each hold one welding jaw 2, 3 and jaw carriers 6, 7 are each used to carry one jaw holder 4, 5 and thus the welding jaws 2, 3. The jaw carriers 6, 7 are each connected to the jaw holders 4, 5 by two rigid connections 18 guided in guideways 17. Two connections 18 are thereby inserted in a sliding manner into two recesses of the jaw carrier 6. A linear drive 8 with a part 11, which is linearly movable along an active line 9 and a stationary part 10, is used as the drive for the jaw movement. The movable part 11 is connected to the gearing 12. The gearing 12 is also connected to the jaw carriers 6, 7 in order to create an opposing movement of the jaw carriers 6, 7 and thus of the welding jaws 2, 3, in order to be able to move the welding jaws 2, 3 toward one another and away from one another.

The gearing 12 includes a cam plate 13, which is connected to the movable part 11. The cam plate 13 has two separate, closed curves 14. Each one cam 15 connected to a jaw carrier 6, 7 is guided along a curve 14. The cams 15 are designed as rollers and roll along the curves 14. The curves 14 are designed mirror-symmetrically to one another with the active line 9 as the axis of symmetry and move in this manner in a constant movement of the welding jaws 2, 3 toward one another or away from one another. A cross-welding of the foil tube 1 occurs therebetween. The cam plate 13 can be exchanged so that during a similar operation of the linear drive 8 an altered jaw movement could be achieved.

A control device 16 is provided in order to control the movement of the movable part 11 in addition time-dependently and to in this manner achieve a relatively long welding duration and a quick opening and closing of the jaws. In order to realize this very quick jaw movement, the linear drive 8 is in addition designed as a linear motor, which functions in accordance with the principles of a suspension railway.

The device illustrated in FIG. 1 extends with its horizontally aligned cam plate 13 mainly in horizontal direction and thus has a very low building height in the vertical direction, which is advantageous for a corresponding vertical tubular bagging machine, which houses this device.

The invention claimed is:

1. A device for welding of a foil tube, comprising two welding jaws, which are movable against one another and clamp the foil tube between one another, two jaw holders, each for holding one welding jaw, two jaw carriers to carry the jaw holders and thus the welding jaws, a linear drive with a part which is linearly movable along an active line and a stationary part, a gearing connected to the movable part, whereby the gearing is connected to the jaw carriers in order to create an opposing movement of the jaw carriers and thus of the welding jaws, and in order to be able to move the welding jaws toward one another and away from one another, wherein the gearing comprises a cam plate connected to the movable part, that the cam plate has two separate curves, and that a cam is connected to each jaw carrier and is guided along one of the two curves.

2. The device according to claim 1, wherein the cam is designed as a roller to roll along the curve.

3. The device according to claim 1, wherein the curves are designed similarly, preferably mirror-symmetrically to one another with the active line as the axis of symmetry.

4. The device according to claim 3, wherein the curves are closed.

5. The device according to claim 1, wherein the cam plate can be exchanged.

6. The device according to claim 1, wherein a control device is provided in order to control the movement of the movable part time-dependently.

7. The device according to claim 1, wherein the linear drive is designed as a linear motor, which functions according to the principle of a suspension railway.

8. The device according to claim 1, wherein the jaw carriers are each connected to the jaw holders by two rigid connections guided in guideways.

9. The device according to claim 1, wherein the plane of the cam plate extends parallel to the plane of the device.

* * * * *